United States Patent
Natarajan et al.

(10) Patent No.: US 11,921,972 B2
(45) Date of Patent: *Mar. 5, 2024

(54) AUGMENTED REALITY SYSTEM VISUALIZATION

(71) Applicant: Capital One Services, LLC, McLean, VA (US)

(72) Inventors: Arunkumar Natarajan, Glen Allen, VA (US); Omari Felix, Chesterfield, VA (US); Colleen Frank, Arlington, VA (US); Venkata Mandali, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,329

(22) Filed: Oct. 13, 2022

(65) Prior Publication Data

US 2023/0072651 A1 Mar. 9, 2023

Related U.S. Application Data

(63) Continuation of application No. 17/329,202, filed on May 25, 2021, now Pat. No. 11,500,511.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/017* (2013.01); *G06F 3/04817* (2013.01);
(Continued)

(58) Field of Classification Search
CPC ............................ G06F 3/4815; G06F 3/04815
See application file for complete search history.

(56) References Cited

U.S. PATENT DOCUMENTS 10,620,948 B2 4/2020 Brebner
2010/0287485 A1* 11/2010 Bertolami ............... G06F 3/011
715/764

(Continued)

OTHER PUBLICATIONS

AR in Action, Banking dreams come to (Augmented) Reality | Hima Mandali & Arun Natarajan | ARIA 2019, <https://www.youtube.com/watch?app=desktop&v=KsR4b78_IRg&feature=youtu.be>, Mar. 2, 2019.

(Continued)

*Primary Examiner* — Roland J Casillas
(74) *Attorney, Agent, or Firm* — Bookoff McAndrews, PLLC

(57) ABSTRACT

A computer-implemented method of diagnosing a technology environment using augmented reality may include: receiving status information corresponding to the technology environment; generating, based on the status information, a 3D visualization of the technology environment; causing an augmented reality device to display the 3D visualization, the 3D visualization including one or more first level icons; receiving first selection information from the augmented reality device, the first selection information corresponding to a first selection gesture performed by a user of the augmented reality device; and in response to the first selection information, causing the augmented reality device to display one or more second level icons as part of the 3D visualization.

20 Claims, 8 Drawing Sheets

(51) Int. Cl.
  *G06F 3/04817* (2022.01)
  *G06F 3/0482* (2013.01)
  *G06F 3/04845* (2022.01)
  *G06T 19/00* (2011.01)

(52) U.S. Cl.
  CPC ........ *G06F 3/0482* (2013.01); *G06F 3/04845* (2013.01); *G06T 19/006* (2013.01); *G06T 2200/24* (2013.01)

(56) References Cited

U.S. PATENT DOCUMENTS

| | | | |
|---|---|---|---|
| 2014/0218361 A1* | 8/2014 | Abe | A63F 13/42 |
| | | | 345/424 |
| 2015/0262428 A1 | 9/2015 | Tatzgern et al. | |
| 2015/0378563 A1* | 12/2015 | Ramanathan | G06F 3/04842 |
| | | | 715/781 |
| 2016/0320836 A1 | 11/2016 | Oyama | |
| 2017/0310542 A1 | 10/2017 | Nair et al. | |
| 2018/0130260 A1* | 5/2018 | Schmirler | G06F 3/011 |
| 2021/0279914 A1* | 9/2021 | Shoup | G06Q 10/20 |

OTHER PUBLICATIONS

TOC on Roundme, Tour by monitoringintelligence, <https://roundme.com/tour/349014/view/1182184>, Jan. 9, 2019.

* cited by examiner

AUGMENTED REALITY SYSTEM VISUALIZATION

CROSS-REFERENCE TO RELATED APPLICATION(S)

This patent application is a continuation of, and claims the benefit of priority to, U.S. Nonprovisional patent application Ser. No. 17/329,202, filed on May 25, 2021, the entirety of which is incorporated herein by reference.

TECHNICAL FIELD

Various embodiments of the present disclosure relate generally to visualizing systems using augmented reality, and more specifically to systems and methods for diagnosing a technology environment using augmented reality.

BACKGROUND

Large enterprises may have complex technology environments with many software and hardware components to monitor and manage. For example, an enterprise technology environment may include dozens of applications, dozens of application programming interfaces (APIs), and dozens of databases, all of which may be hosted on geographically distributed servers. From time to time, one or more components of an enterprise technology environment may fail and require troubleshooting.

A failure of one or more components in an enterprise technology environment may manifest in any number of ways. For example, when using client-facing enterprise software, clients of the enterprise may be unable to access the enterprise's products or services. An underlying failure, however, may not be immediately apparent and may require extensive troubleshooting of the enterprise technology environment to identify the underlying failure. A technician may have little choice but to check the status of dozens or even hundreds of components of the enterprise technology environment to identify the underlying failure, which may take many hours. Further, troubleshooting tools may fail to alleviate the arduousness of the task.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for diagnosing a technology environment using augmented reality are described.

In one example, a computer-implemented method of diagnosing a technology environment using augmented reality may include: receiving status information corresponding to the technology environment, the status information including operational relationships between components of the technology environment; generating, based on the status information, a 3D visualization of the technology environment; causing an augmented reality device to display the 3D visualization, the 3D visualization including one or more first level icons, each first level icon representing a subset of components of the technology environment; receiving first selection information from the augmented reality device, the first selection information corresponding to a first selection gesture performed by a user of the augmented reality device, the first selection information being indicative of at least one first level icon; and in response to the first selection information, causing the augmented reality device to display one or more second level icons as part of the 3D visualization, the one or more second level icons being associated with the at least one first level icon.

In another example, a system for diagnosing a technology environment using augmented reality may include: one or more memories storing instructions; and one or more processors operatively connected to the one or more memories. The one or more processors may be configured to execute the instructions to: receive status information corresponding to the technology environment, the status information including operational relationships between components of the technology environment; generate, based on the status information, a 3D visualization of the technology environment; cause an augmented reality device to display the 3D visualization, the 3D visualization including one or more first level icons, each first level icon representing a subset of components of the technology environment; receive first selection information from the augmented reality device, the first selection information corresponding to a first selection gesture performed by a user of the augmented reality device, the first selection information being indicative of at least one first level icon; and in response to the first selection information, cause the augmented reality device to display one or more second level icons as part of the 3D visualization, the one or more second level icons being associated with the at least one first level icon.

In a further example, a system for diagnosing a technology environment using augmented reality may include: a first augmented reality device and a second augmented reality device; one or more memories storing instructions; and one or more processors operatively connected to the one or more memories. The one or more processors may be configured to execute the instructions to: receive status information corresponding to the technology environment, the status information including operational relationships between components of the technology environment, the status information further including identifications of errors within components of the technology environment; generate, based on the status information, a 3D visualization of the technology environment; cause the first augmented reality device to display the 3D visualization, the 3D visualization including one or more first level icons, each first level icon representing a subset of components of the technology environment; receive, from the second augmented reality device, a session request; in response to the session request, cause the second augmented reality device to display the 3D visualization; receive first selection information from the first augmented reality device, the first selection information corresponding to a first selection gesture performed by a user of the first augmented reality device, the first selection information being indicative of at least one first level icon; and in response to the first selection information, cause the first augmented reality device and the second augmented reality device to display one or more second level icons as part of the 3D visualization, the one or more second level icons being associated with the at least one first level icon.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
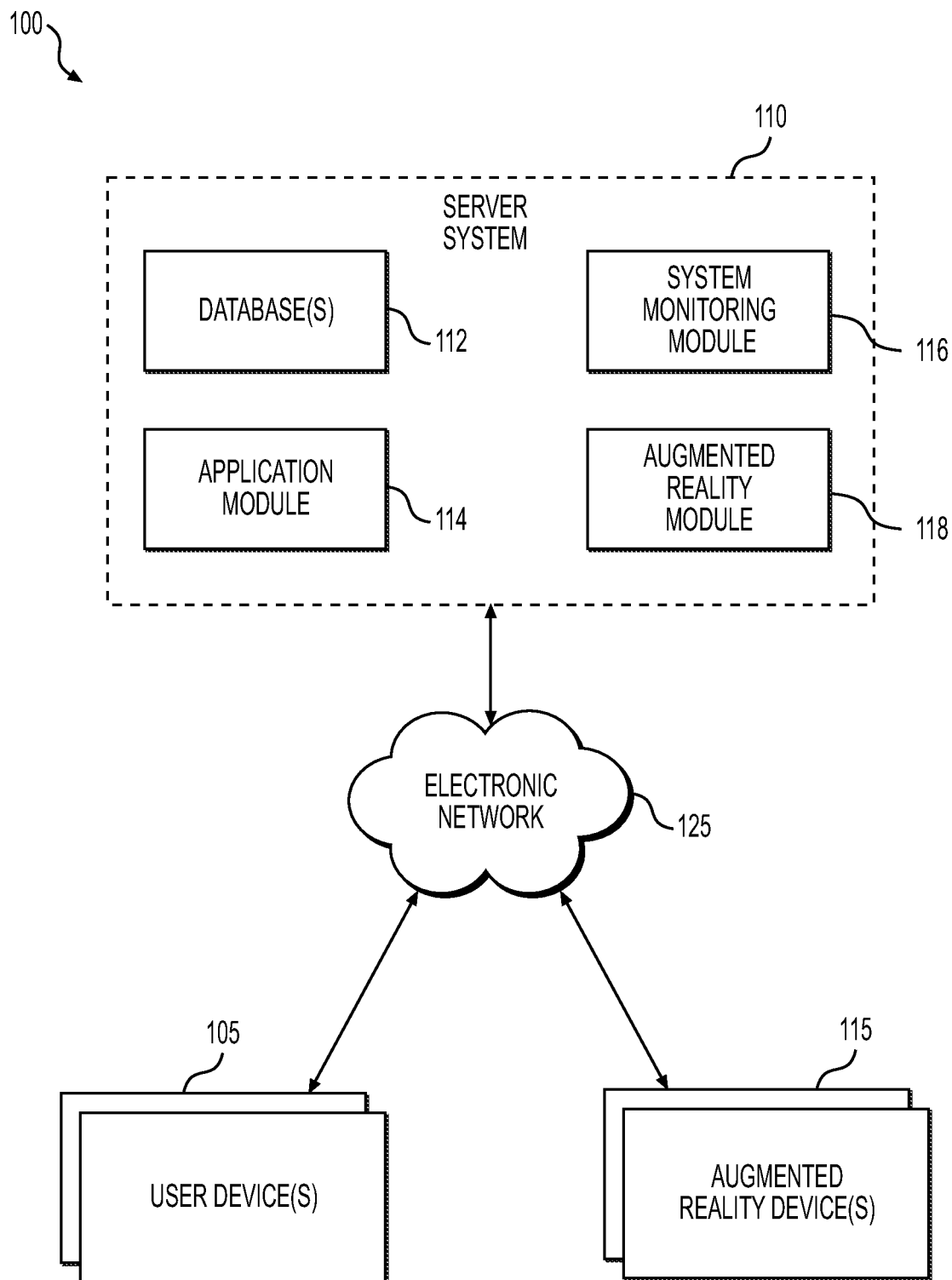
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "technology environment" or the like, as used herein, generally refers to a software system, including applications, application programming interfaces (APIs), databases, data, and the like, as well as the hardware supporting and/or hosting the software system, including servers, cloud infrastructures, and the like. The term "components" or the like, as used herein, may refer to the aforementioned elements of a technology environment.

In general, the present disclosure is directed to visualizing systems using augmented reality, and more specifically to systems and methods for diagnosing a technology environment using augmented reality. The methods and systems according to the present disclosure offer significant technical benefits which will become apparent.

As more and more activity can and does occur online, the complexity of enterprise technology environments increases. Various enterprises, including social media companies, ride-sharing companies, financial institutions, government entities, and the like may have complex technology environments with many components to monitor and manage. Many such enterprises may offer client-facing or customer-facing software such as mobile phone applications and/or web applications to allow clients and/or customers access to products and/or services. Enterprises may also have various internal software systems with which employees may work. Consequently, an enterprise technology environment may have many components, including dozens of applications, dozens of application programming interfaces (APIs), and dozens of databases, all of which may be hosted on geographically distributed servers and/or cloud infrastructures.

Components of enterprise technology environments may experience errors or failures for any number of reasons. For example, an update to an application may include a bug, a hardware component within the system may malfunction, a database may lose connectivity, or the like. In a large technology environment, such an error or failure may not be immediately identifiable. An error or failure may simply manifest as an inability by some end user, such as a client or customer, to perform some expected action. For example, a customer attempting to access an enterprise's products and/or services via a mobile application may be unable to load or connect to the mobile application. Once the enterprise is made aware of the customer's issue, one or more technicians may trace the issue through its software system to the source error or failure by troubleshooting.

Identifying the underlying error or failure, e.g., the source of a customer's issue, within a large technology environment may, however, be a time consuming and difficult task. Frequently, technicians may check the status of dozens or even hundreds of components of the technology environment, which may take many hours. Technicians using ordinary computer terminals may have to navigate numerous troubleshooting tools simultaneously to understand the interrelations between different components of the technology environment. As monitors for such computer terminals are naturally limited in size, technicians may be forced to repeatedly switch between windows for the troubleshooting tools, all the while being unable to see any single graphical representation of the entire technology environment. As a result, technicians may be required to undergo extensive training to be able to perform such troubleshooting and such troubleshooting may also be very time consuming for even the most well-trained technicians.

Moreover, the longer it takes for technicians to troubleshoot software system errors and failures, the longer customers may experience issues with customer-facing aspects of a technology environment. Accordingly, extensive troubleshooting time during which products and/or services are unavailable to clients or customers may lead to lost sales and/or lost good will for an enterprise.

Accordingly, a need exists to address the foregoing challenges. Particularly, a need exists to improve tools for diagnosing failures within complex technology environments. Embodiments of the present disclosure offer technical solutions to address the foregoing needs, as well as other needs.

FIG. 1 depicts an exemplary computing environment 100 that may be utilized with techniques presented herein. One or more user device(s) 105, a server system 110, and one or more augmented reality device(s) 115 may communicate across an electronic network 125. The user device 105 may be associated with, and used by, a user. The systems and devices of the computing environment 100 may communicate in any arrangement. As will be discussed herein, systems and/or devices of the computing environment 100 may communicate in order to generate and display augmented reality visualizations which may allow for the diagnosis of a technology environment.

The user device 105 may be a computer system such as, for example, a desktop computer, a mobile device, etc. In an exemplary embodiment, the user device 105 may be a cellphone, a tablet, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the computing environment 100. For example, the electronic application(s) may include a web browser, another application, or the like configured to allow access to products or services offered by an enterprise.

Errors or failures within an enterprise technology environment may manifest on user device 105. An enterprise technology environment may, for example, include a combination of software and hardware that support one or more applications through which clients and/or customers may access the enterprise's products and services. The applications may be accessible by clients and/or customers via user device 105. In the event of an error or failure somewhere within the technology environment, clients and/or customers may be unable to access the applications via user device 105. For example, user device 105 may fail to load the applications, may fail to connect to servers within the technology environment, or the like.

Server system 110 may be a computer system for hosting, running, and/or maintaining a software system for an enterprise. Server system 110 may comprise one or more server devices and the one or more server devices may be located in one or more physical locations. For example, server system 110 may exist within a cloud infrastructure supported by a plurality of server devices distributed across multiple geographical locations. Server system 110 may include database(s) 112, an application module 114, a system monitoring module 116, and an augmented reality module 118.

Database 112 may store various data for the enterprise, including customer data and/or internal enterprise data. For example, for an enterprise that provides social media products or services, database 112 may store social media account information for customers having a social media account, or the like. For an enterprise that provides ride-sharing products or services, database 112 may store driver information, rider information, route information, or the like. For an enterprise that provides financial products or services, database 112 may store account information, transaction information, or the like. For government entities, database 112 may store personal identification information or the like. Data stored within database 112 may be accessible by a client or customer using user device 105. Database 112 may further store internal enterprise information accessible by employees and authorized personnel of the enterprise but not accessible by a client or customer.

Application module 114 may host and/or include any number of applications involved in an enterprise technology environment. For example, application module 114 may include customer-facing applications such as social media applications, ride-sharing applications, banking applications, or government applications used by a user of user device 105. Application module 114 may further include other applications that are not customer-facing, such as applications used by employees of an enterprise. Application module 114 may further include application programming interfaces (APIs) which may allow communication and/or data transmission between applications and/or any other software related to applications of the technology environment.

System monitoring module 116 may monitor the operation and/or functionality of server system 110, including the operation and/or functionality of database 112, application module 114, and augmented reality module 118. System monitoring module 116 may further monitor the operation and/or functionality of subcomponents of server system 110, including individual server systems, applications, APIs, and the like. System monitoring module 116 may include, maintain, and/or generate a mapping of relationships between subcomponents of server system 110. For example, system monitoring module 116 may map a relationship between a customer-facing application of application module 114 and an API of application module 114, a relationship between the API and another application of application module 114, and/or a relationship between the other application and database 112. System monitoring module 116 may comprise any system monitoring tool including commercially available system monitoring software, custom system monitoring software, or the like.

Augmented reality module 118 may generate augmented reality visualizations, as described hereinafter in greater detail. Augmented reality module 118 may also cause the augmented reality visualizations to be displayed by one or more augmented reality devices 115. Augmented reality module 118 may additionally be configured receive instructions and/or information from augmented reality devices 115, including instructions related to augmented reality visualizations. Augmented reality module 118 may further be configured to receive information corresponding to a physical space in which an augmented reality device 115 is located and may configure an augmented reality visualization accordingly.

Augmented reality devices 115 may be devices configured to display augmented reality visualizations. Augmented reality devices 115 may include wearable devices, such as Microsoft HoloLens headsets, Google Glass headsets, Oculus headsets, or the like. Augmented reality devices 115 may receive augmented reality visualizations from augmented reality module 118 which may in turn be displayed to viewers using augmented reality devices 115. Augmented reality visualizations displayed by augmented reality devices 115 may be, for example, 3-dimensional (3D) visualizations superimposed on physical environments. Augmented reality devices 115 may also be configured to receive input from users, such as physical gestures, interpret the input, and transmit information corresponding to the input to augmented reality module 118. Augmented reality devices 115 may further include one or more sensors, such as image sensors, depth sensors, and/or motion sensors. The one or more sensors may collect information, such as image data, corresponding to a physical space in which an augmented reality device 115 is located. The one or more sensors may additionally collect information corresponding to physical gestures made by a user of an augmented reality device 115 and may include sensors embedded in hand-held devices for collecting such information.

In various embodiments, the electronic network 125 may be a wide area network ("WAN"), a local area network ("LAN"), personal area network ("PAN"), or the like. In some embodiments, electronic network 125 may be a secured network. In some embodiments, the secured network may be protected by any of various encryption techniques. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. Any suitable arrangement of the various systems and devices of the computing environment 100 may be used.

Figure 2:
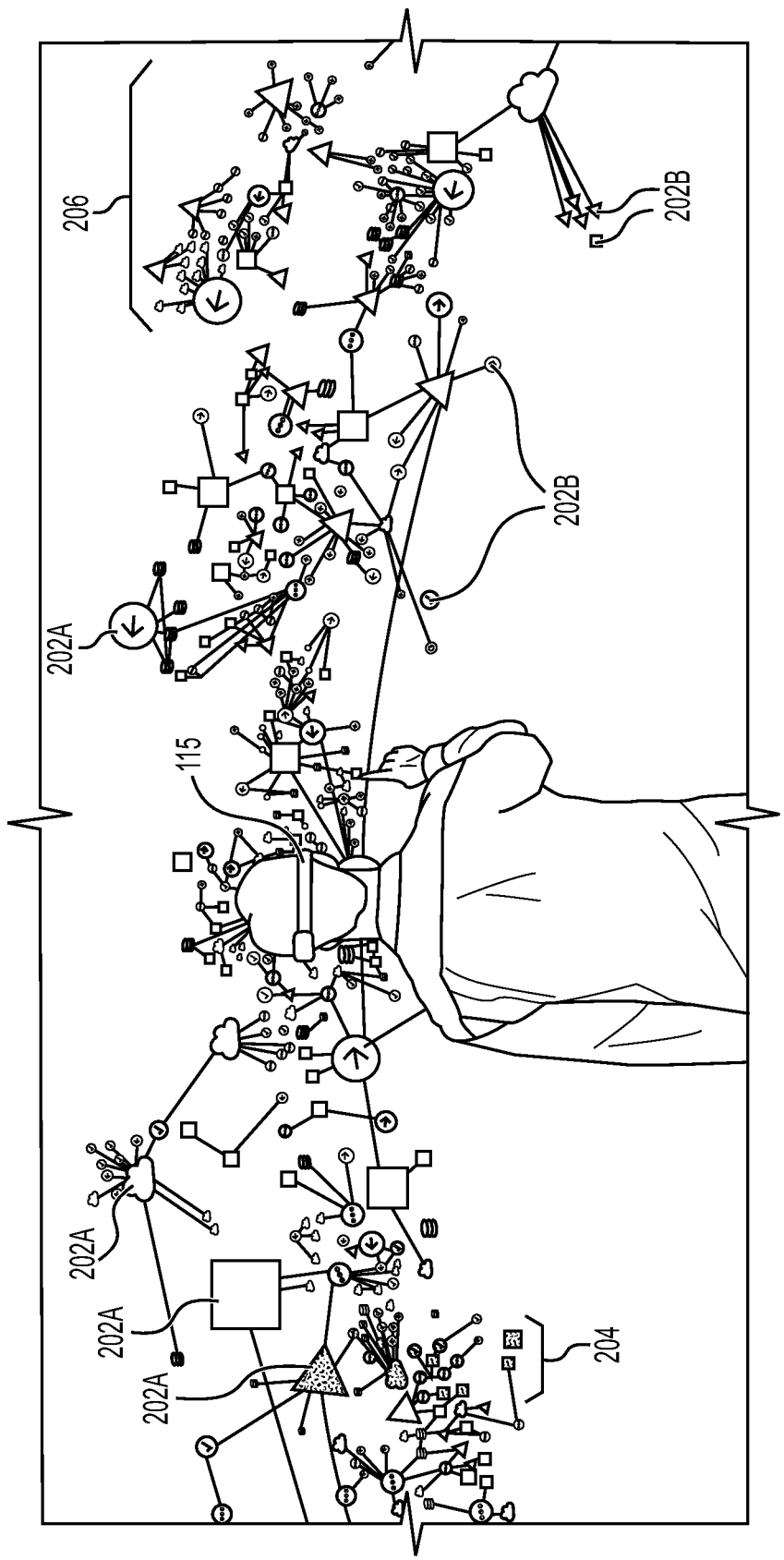
FIG. 2 depicts an exemplary augmented reality visualization, according to one or more embodiments.
Figure 3:
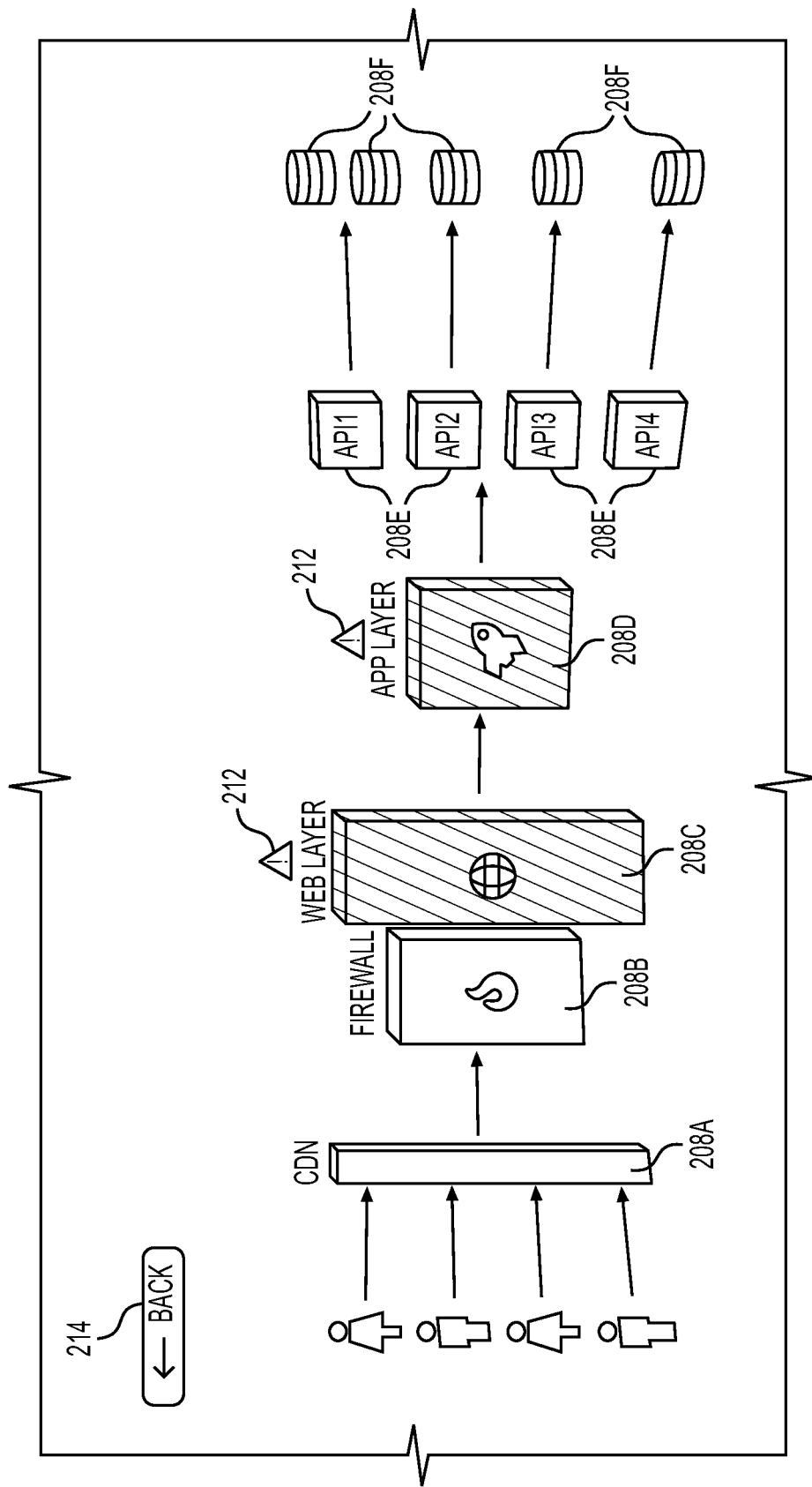
FIG. 3 depicts an exemplary augmented reality visualization, according to one or more embodiments.
Figure 4:
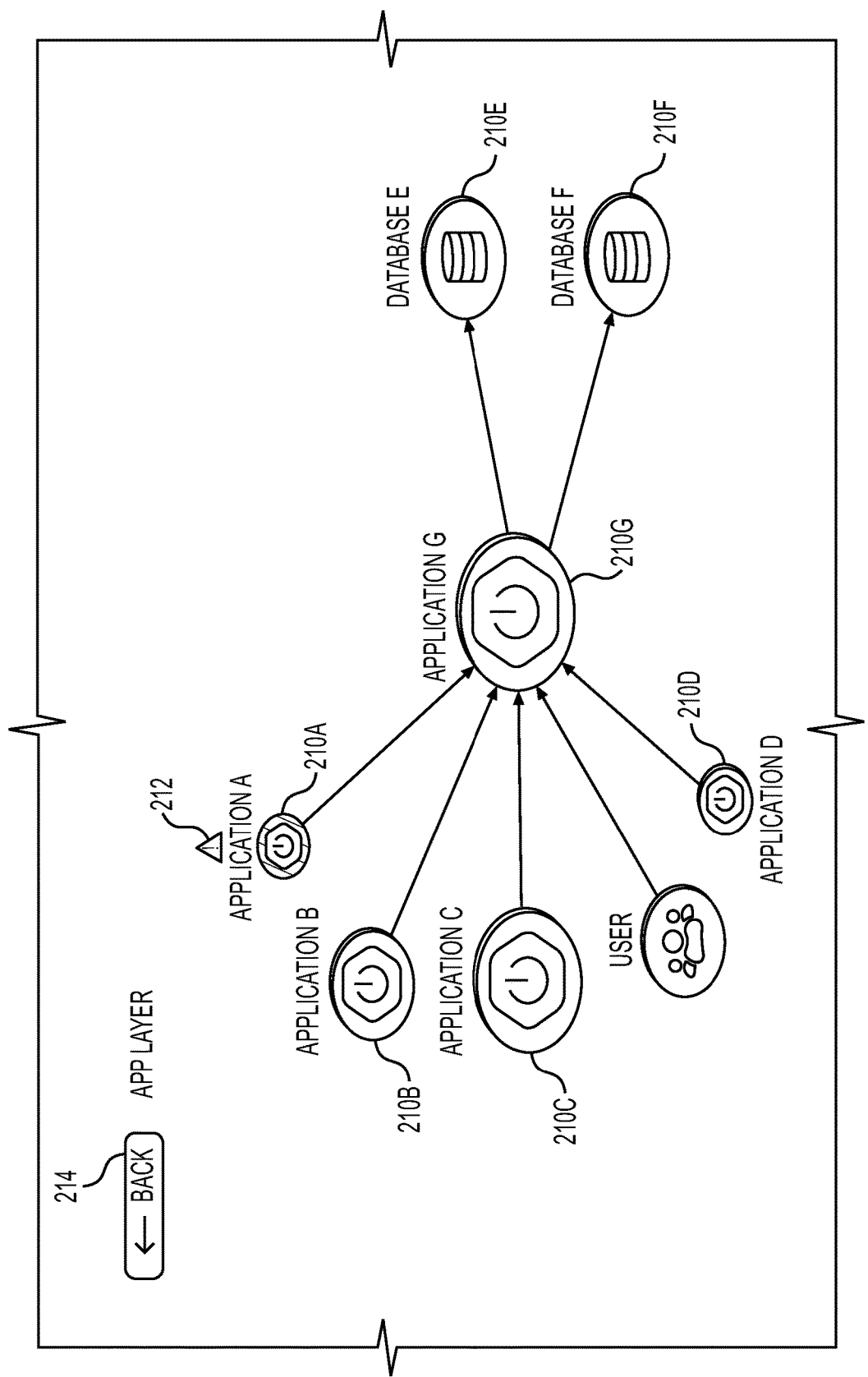
FIG. 4 depicts an exemplary augmented reality visualization, according to one or more embodiments.

FIGS. 2-4 illustrate an example of an augmented reality visualization of a technology environment as well as an example navigation thereof. As shown in FIG. 2, a viewer may wear augmented reality device 115 as a headset; however, the present disclosure is not limited to wearable devices and the viewer may interact with augmented reality device 115 in other manners. The viewer may be, for example, a technician tasked with monitoring a technology environment and/or diagnosing errors or failures within the technology environment. The viewer may be tasked with diagnosing errors or failures in response to alerts that clients or customers are unable to access products and/or services via user devices 105.

Via augmented reality device 115, an augmented reality visualization comprising a plurality of first level icons may be displayed to the viewer. For purposes of illustration only, FIG. 2 shows both the augmented reality visualization and augmented reality device 115. It is to be understood, however, that the augmented reality visualization would be provided to the viewer by augmented reality device 115. The augmented reality visualization may be a 3D visualization such that the first level icons may not necessarily be displayed in a single plane, but may occupy a 3D space or volume. The augmented reality visualization may further be superimposed on or against a physical environment in which the viewer is located. The augmented reality visualization and the plurality of first level icons may collectively represent a technology environment and its constituent components.

The plurality of first level icons may include node icons 202A and peripheral icons 202B. Node icons 202A and peripheral icons 202B may be arranged in a web-like formation, as shown in FIG. 2, or any other formation. In the web-like formation, node icons 202A may be displayed with strands linking node icons 202A to peripheral icons 202B. Node icons 202A may further be linked to other node icons 202A. Peripheral icons 202B may be linked to one or more node icons 202A and/or one or more peripheral icons 202B. A peripheral icon 202B may generally be linked to fewer other first level icons than a node icon 202A.

Node icons 202A and peripheral icons 202B may represent any logical groupings of components within the software environment. For example, if the technology environment is associated with a large enterprise offering various products and services, node icons 202A may represent business units or departments of the enterprise. In that example, peripheral icons 202B linked to a particular node icon 202A may represent components of the technology environment related to the business unit represented by the particular node icon 202A. Alternatively, node icons 202A may represent a component of the technology environment that is related to multiple other components. For example, node icons 202A may represent a particular cloud service, which hosts multiple applications, databases, and/or other software. Peripheral icons 202B linked to that node icon 202A may represent components related to the cloud service, such as the applications, databases, and/or other software hosted thereon. While specific examples of what the plurality of first level icons may represent have been provided, it should be understood that the first level icons need not be limited to any particular example and may instead be arranged in any suitable configuration to form an augmented reality visualization of a technology environment.

Linked node icons 202A and peripheral icons 202B may form icon clusters, such as first cluster 204 and second cluster 206. First cluster 204 and second cluster 206 may each, respectively, be a group of linked node icons 202A and peripheral icons 202B. Additionally, a status identifier may be associated with each of first cluster 204 and second cluster 206. For example, a status identifier associated with first cluster 204 (shown in FIG. 2 as comprising shaded first level icons) may indicate that one or more components represented by the first level icons of first cluster 204 are experiencing an error or failure whereas a status identifier associated with second cluster 206 (shown in FIG. 2 as comprising unshaded first level icons) may indicate that components represented by the icons of second cluster 206 are operating normally. As shown in FIG. 2, a status identifier indicative of an error or failure may be a different color than a status identifier indicative of normal operation. For example, red icons in a cluster may be indicative of an error or failure whereas green icons in a cluster may be indicative of normal operation. Additionally, other colors such as yellow and orange may be used to indicate one or more intermediate statuses between failure and normal operation. Status identifiers need not be limited to coloring of icons, however, and may also include one or more warning icons displayed near a cluster of icons, or any other identifier.

In response to seeing first cluster 204 being associated with a status identifier indicative of an error or failure, the viewer may wish to investigate the error or failure and may select one or more of the icons of first cluster 204. The viewer may make such a selection by performing a physical gesture directed at the one or more icons.

In response to the viewer's gesture, the augmented reality device 115 may display a plurality of second level icons 208A-208F, as shown in FIG. 3. The second level icons 208A-208F may be displayed in addition to the first level icons shown in FIG. 2, or alternatively, the first level icons may first cease being displayed, e.g., disappear, and second level icons 208A-208F may be displayed instead. The augmented reality device 115 may further display a back icon 214 to allow the viewer to navigate to a previous configuration of the visualization (e.g., the visualization shown in FIG. 2) and one or more warning icons 212.

As shown in FIG. 3, second level icon 208A may represent a content delivery network (CDN), second level icon 208B may represent a firewall, second level icon 208C may represent a web layer, second level icon 208D may represent an application layer, second level icons 208E may each represent an API, and second level icons 208F may each represent a database, all of which may be components of the technology environment. Each of the second level icons 208A-208F may include a status identifier associated therewith. As shown in FIG. 3, second level icon 208C and second level icon 208D may each be colored differently (shown with hatching lines in FIG. 3) than a remainder of the second level icons 208A-208B and 208E-208F and may further include warning icons 212 positioned adjacent thereto to indicate that the web layer and application layer are experiencing errors or failures. While both different coloring and warning icons 212 are shown to identify second level icons that are potentially experiencing an error, in other arrangements only coloring or only warning icons 212 may be utilized to identify such second level icons.

In response to seeing the status identifiers for the web layer and application layer, the viewer may wish to investigate the identified errors or failures and may select either second level icon 208C or second level icon 208D. The viewer may make such a selection by performing a physical gesture directed at either second level icon 208C or second level icon 208D. In response to the viewer's gesture, the augmented reality device 115 may display a plurality of third level icons 210A-210G representing components associated with the application layer represented by second level icon 208D, as shown in FIG. 4. For the sake of simplicity, only a visualization resulting from a selection of second level icon 208D is shown in FIG. 4; however, it is to be understood that a similar visualization could result from a selection of second level icon 208C.

The third level icons 210A-210G may be displayed in addition to the first level icons shown in FIG. 2 and/or the second level icons 208A-208F shown in FIG. 3, or alternatively, the first level icons and second level icons may first cease being displayed and third level icons 210A-210G may be displayed instead. The augmented reality device 115 may further display a back icon 214 to allow the viewer to navigate to a previous configuration of the visualization (e.g., the visualization shown in FIG. 3) and one or more warning icons 212.

As shown in FIG. 4, third level icon 210A may represent an Application A, third level icon 210B may represent an Application B, third level icon 210C may represent an Application C, third level icon 210D may represent an Application D, third level icon 210E may represent a Database E, third level icon 210F may represent a Database F, and third level icon 210G may represent an Application G. Each of the third level icons 210A-210G may include a status identifier associated therewith. As shown in FIG. 4, third level icon 210A may be colored differently (shown with hatching lines in FIG. 4) than the remaining second level icons 210B-210G and may further include a warning icon 212 positioned adjacent thereto to indicate that Application A is experiencing an error or failure. While both different coloring and a warning icon 212 is shown to identify the third level icon that is potentially experiencing an error, in other arrangements only coloring or only a warning icon 212 may be utilized to identify such third level icons.

In response to seeing the status identifier for Application A, the viewer may wish to investigate the identified error or failure and may select third level icon 210A. The viewer may make such a selection by performing a physical gesture directed at third level icon 210A. In response to the viewer's gesture, the augmented reality device 115 may display one or more options for causing an operational change to Application A for remediating the error or failure. For example, the augmented reality device may display an icon for restarting Application A, an icon for disabling Application A, an icon for replacing Application A with a functioning application, or the like. Options for causing operational changes need not be limited to any particular example provided herein, but rather may be any suitable operational change for a component of the technology environment.

Upon selection of an option for causing an operational change to Application A that is sufficient to remediate the error or failure experienced by Application A, the error or failure may indeed be remediated and status identifiers for icons within the augmented reality visualization may change to indicate that no error or failure exists in components of the technology environment represented by the icons.

In some embodiments, if the viewer wishes to continue investigating and/or diagnosing the technology environment, the viewer may make a movement gesture directed toward the third level icons 210A-210G shown in FIG. 4. In response to the movement gesture, the third level icons 210A-210G may individually or collectively be moved to a different location of the augmented reality visualization. The viewer may then navigate back to the second level icons 208A-208F shown in FIG. 3 and may select second level icon 208C corresponding to the web layer, for example. In response to the selection, a separate set of third level icons corresponding to components of the web layer may be displayed in addition to third level icons 210A-210G. Accordingly, the viewer may be able to rearrange the augmented reality visualization to accommodate multiple sets of icons representing different groupings of components of the technology environment. Moreover, status identifiers for both the separate set of third level icons and the third level icons 210A-210G may update in real time, allowing the viewer to understand environment-wide impacts, if any, of an operational change to an individual component.

As shown in FIGS. 2-4, systems and methods as disclosed herein may allow the viewer to navigate from an augmented reality visualization representative of an entire technology environment (FIG. 2) to a precise component of the technology environment experiencing an error or failure (Application A of FIG. 4) in few steps and with ease.

While first, second, and third level icons are described herein with reference to FIGS. 2-4, it is to be understood that an augmented reality visualization within the scope of this disclosure need not necessarily have three levels of icons, and that an augmented reality visualization within the scope of this disclosure may have fewer or more than three levels of icons.

Hereinafter, methods of using the computer environment 100 are described. In the methods described, various acts are described as performed or executed by one or more components shown in FIG. 1, such as application module 114, system monitoring module 116, augmented reality module 118, or augmented reality device 115. However, it should be understood that in various embodiments, various components or combinations of components of the computing environment 100 discussed above may execute instructions or perform acts including the acts discussed below. Further, it should be understood that in various embodiments, various steps may be added, omitted, and/or rearranged in any suitable manner.

Figure 5:
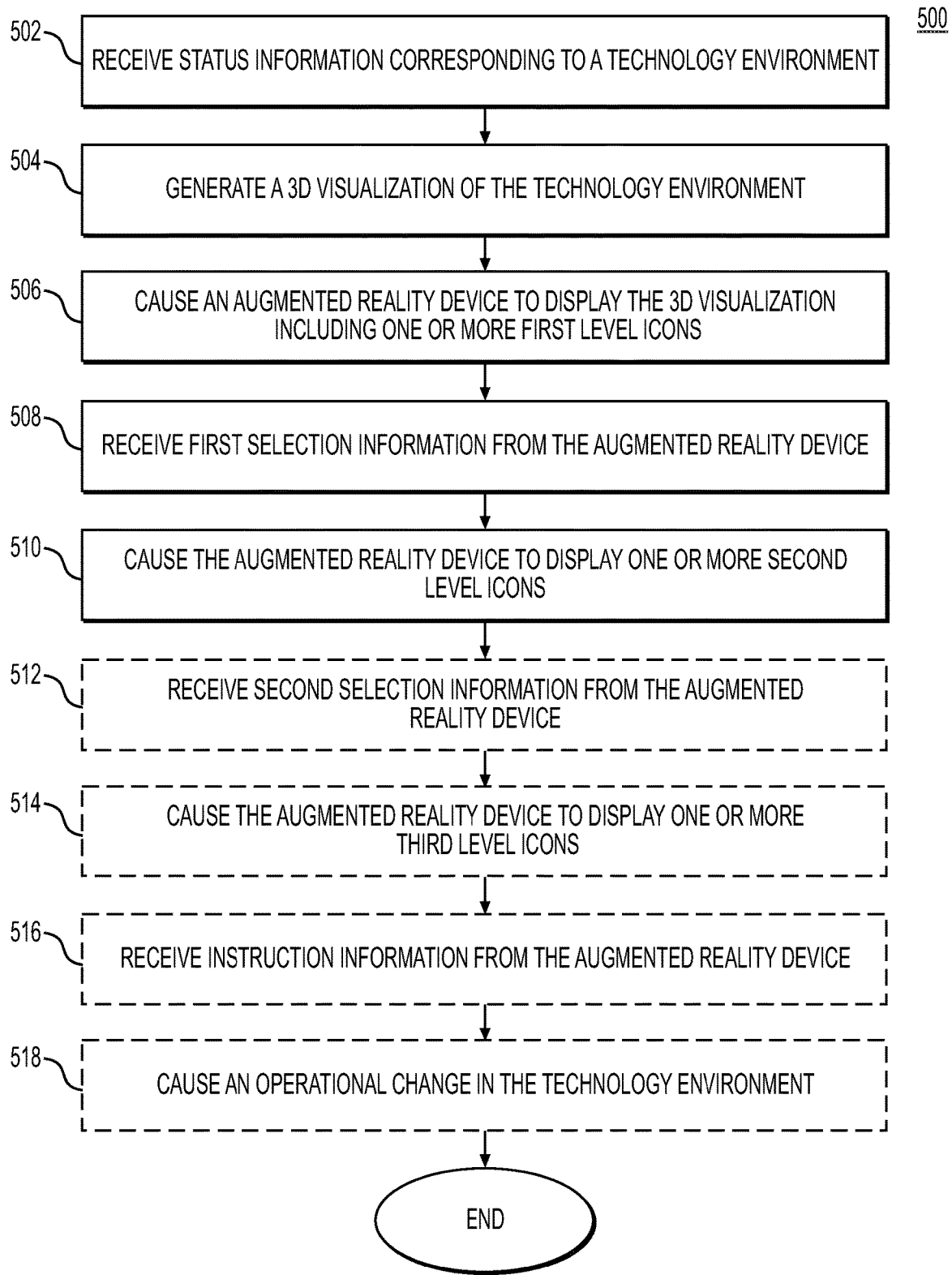
FIG. 5 depicts a flowchart of an exemplary method of diagnosing a technology environment using augmented reality, according to one or more embodiments.

FIG. 5 depicts an exemplary process 500 of displaying and navigating a 3D augmented reality visualization that is representative of a technology environment, according to one or more embodiments. It is to be understood that the process 500 may include fewer than all steps shown in FIG. 5 or may alternatively include additional steps not shown in FIG. 5.

At step 502, augmented reality module 118 of server system 110 may receive status information corresponding to a technology environment. The technology environment may include a combination of hardware and software components that may collectively allow an enterprise to offer products and/or services to clients and/or customers, as described herein previously. The status information may be received from system monitoring module 116, which may be responsible for collecting operating information for the technology environment and generally monitoring the technology environment.

The status information may include information about operational relationships between components of the technology. For example, the technology environment may include applications, APIs, and databases, each of which may be hosted on one or more of a set of server devices. For any given application, the status information may identify APIs with which the application interacts, databases the application accesses, one or more servers hosting the application, and/or the like. Similarly, for any given API, the status information may identify applications with which the API interacts, one or more servers hosting the API, and/or the like. Additionally, for any given database, the status information may identify any applications by which the database is accessed, one or more servers hosting the database, and/or the like. In effect, the status information may include a mapping of the overall technology environment, which identifies, for each component, any other component having an operational relationship therewith. It should be understood that the operational relationships described herein are exemplary only and information relating to any other operational relationships between components of the technology environment may be included in the status information.

The status information may further identify errors and/or failures experienced by components of the technology environment. Such identifications may be real-time or near real-time identifications. Errors and failures may include any deviations from normal functionality of individual components and/or the collective technology environment. For example, errors and failures may include an application crashing, a database going offline, a server malfunctioning, an invalid API call, and the like. In some cases, errors and failures may result in one or more customers being unable to access an enterprise's products or services.

At step 504, augmented reality module 118 may generate a 3D visualization of the technology environment based on the status information. Augmented reality module 118 may generate the 3D visualization using one or more graphics processing units (GPUs) incorporated therein. The 3D visualization may incorporate operational relationships between components of the technology environment and may further incorporate identifications of errors and/or failures experienced by components of the technology environment.

At step 506, augmented reality module 118 may cause augmented reality device 115 to display the 3D visualization. Initially, the 3D visualization may include one or more first level icons and appear similarly to the augmented reality visualization shown in FIG. 2 and described herein previously. As in FIG. 2, the 3D visualization may include one or more node icons 202A and one or more peripheral icons 202B, where each of the node icons 202A and peripheral icons 202B are representative of components or groups of components within the technology environment. The 3D visualization may further include strands extending between the first level icons to show operational relationships between components represented by the first level icons.

As described herein previously with reference to FIG. 2, the 3D visualization may further include one or more status identifiers associated with the first level icons. The status identifiers may indicate whether any of the components represented by the one or more first level icons are experiencing an error or failure. The status identifiers may be, for example, color coded, such that red may be indicative of an error or failure, green may be indicative of normal operation, and other colors may be indicative of other statuses as desired. The status identifiers may further incorporate one or more warning icons 212, as described above with reference to FIGS. 3 and 4. A warning icon 212 may be displayed adjacent or near a first level icon or a cluster of first level icons to indicate an error or failure.

At step 508, augmented reality module 118 may receive first selection information from augmented reality device 115. The first selection information may be generated by augmented reality device 115 in response to a physical gesture made by a viewer of the 3D visualization that is directed to one or more of the first level icons. In other words, the first selection information may be indicative of a selection of one or more first level icons made by the viewer. The viewer may make such a selection, for example, in response to seeing one or more status identifiers indicative of an error or failure of one or more components represented by the one or more first level icons and may wish to investigate the error or failure further.

At step 510, in response to receiving the first selection information, augmented reality module 118 may cause augmented reality device 115 to display one or more second level icons. The one or more second level icons may be associated with the one or more first level icons selected by the viewer and may further be representative of a subset of components represented by the one or more first level icons. The one or more second level icons may appear similarly to those shown in FIG. 3 and may further be displayed by augmented reality device 115 in addition to the first level icons. Alternatively, the first level icons may cease to be displayed in response to the first selection information and the second level icons may be displayed instead. As described herein previously, one or more status identifiers may be associated with the one or more second level icons.

In some embodiments, at step 512, augmented reality module 118 may receive second selection information from augmented reality device 115. The second selection information may be generated by augmented reality device 115 in response to a physical gesture made by the viewer and corresponding to one or more of the second level icons. In other words, the second selection information may be indicative of a selection of one or more second level icons by the viewer. The viewer may make such a selection, for example, in response to seeing one or more status identifiers indicative of an error or failure of one or more components represented by one or more second level icons and may wish to investigate the error or failure further.

In some embodiments, at step 514, in response to receiving the second selection information, augmented reality module 118 may cause augmented reality device 115 to display one or more third level icons. The one or more third level icons may be associated with the one or more second level icons selected by the viewer. The one or more third level icons may appear similarly to those shown in FIG. 4 and may further be displayed by augmented reality device 115 in addition to the first level icons and/or second level icons. Alternatively, the first level icons and/or second level icons may cease to be displayed, e.g., may disappear, in response to the second selection information and the third level icons may be displayed instead. As described herein previously, one or more status identifiers may be associated with the one or more third level icons.

In some embodiments, at step 516, system monitoring module 116 may receive instruction information from augmented reality device 115. The instruction information may be generated by augmented reality device 115 in response to a physical gesture made by the viewer and corresponding to one or more of the third level icons. The instruction information may further indicate a requested operational change to one or more components represented by the one or more third level icons. The viewer may make such a selection, for example, in response to seeing one or more status identifiers indicative of an error or failure of one or more components represented by one or more third level icons. The requested operational change may be selected to remediate or attempt to remediate the error or failure.

In some embodiments, at step 518, in response to receiving the instruction information, system monitoring module 116 may cause the selected operational change. As described herein previously, the operational change may involve restarting an application, disabling an application, replacing an application with a functioning application, rebooting a server, or the like. Operational changes need not be limited to any particular example provided herein, but rather may be any operational change that may affect the functionality of one or more components of the technology environment.

It is to be understood that process 500 need not necessarily be performed in the exact order described herein and the steps described herein may be rearranged in some embodiments. Further, in some embodiments fewer than all steps of process 500 may be performed and in some embodiments additional steps may be performed.

Process 500 as described herein may allow a viewer, who may be a technician tasked with diagnosing a technology environment, to view an augmented reality visualization representative of the technology environment. The viewer may further navigate the augmented reality visualization using visual cues from status identifiers to identify particular components that are experiencing errors or failures. The viewer may then request operational changes to the technology environment via augmented reality device 115 accordingly. Process 500 may therefore allow a viewer to easily track and remediate errors or failures in few steps, saving substantial amounts of time.

Figure 6:
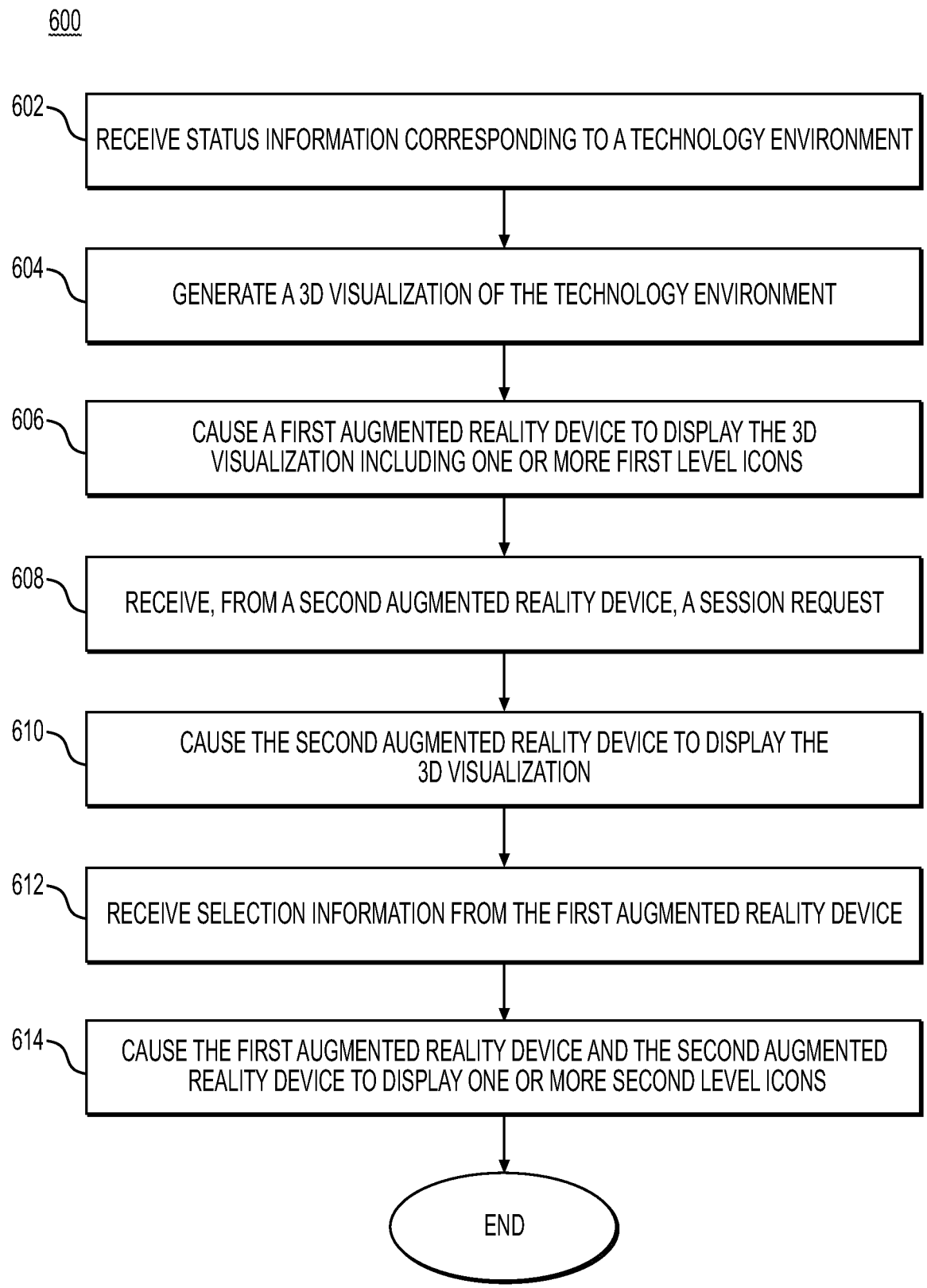
FIG. 6 depicts a flowchart of an exemplary method of displaying an augmented reality visualization using a plurality of devices, according to one or more embodiments.

FIG. 6 illustrates an exemplary process 600 of displaying a 3D augmented reality visualization that is representative of a technology environment on a plurality of augmented reality devices, according to one or more embodiments. It is to be understood that the process 600 may include fewer than all steps shown in FIG. 6 or may alternatively include additional steps not shown in FIG. 6.

At step 602, augmented reality module 118 of server system 110 may receive status information corresponding to a technology environment. Step 602 may be substantially the same as step 502 described herein previously. At step 604, augmented reality module 118 may generate a 3D visualization of the technology environment based on the status information. Step 604 may likewise be substantially the same as step 504 described herein previously. At step 606, augmented reality module 118 may cause a first augmented reality device 115 to display the 3D visualization to a first viewer. Step 606 may also be substantially the same as step 506 described herein previously.

At step 608, augmented reality module 118 may receive a session request from a second augmented reality device 115. The session request may be generated by the second augmented reality device 115 in response to an instruction made by a second viewer to access and display the 3D visualization with the second augmented reality device 115. The second viewer may make such a request, for example, when the second viewer wishes to initiate a joint session with first viewer in which both the first viewer and second viewer are able to view and/or interact with the 3D visualization.

At step 610, augmented reality module 118 may cause the second augmented reality device 115 to display the 3D visualization. The 3D visualization displayed by second augmented reality device 115 may be substantially the same as the 3D visualization displayed by first augmented reality device 115. If first augmented reality device 115 and second augmented reality device 115 are located in the same general physical location, first augmented reality device 115 and second augmented reality device 115 may display the same 3D visualization such that icons of the 3D visualization are each displayed at a single position, regardless of whether they are displayed by first augmented reality device 115 or second augmented reality device 115. Alternatively, if first augmented reality device 115 and second augmented reality device 115 are located in geographically remote locations, such as different cities, for example, first augmented reality device 115 and second augmented reality device 115 may each display a copy of the 3D visualization in the respective locations.

At step 612, augmented reality module 118 may receive selection information from first augmented reality device 115. The selection information may be generated by first augmented reality device 115 in response to a physical gesture made by the first viewer and corresponding to one or more of the first level icons of the 3D visualization. In other words, the first selection information may be indicative of a selection of one or more first level icons made by the first viewer. The first viewer may make such a selection, for example, in response to seeing one or more status identifiers indicative of an error or failure of one or more components represented by the one or more first level icons and may wish to investigate the error or failure further.

At step 614, in response to receiving the first selection information, augmented reality module 118 may cause first augmented reality device 115 and second augmented reality device 115 to both display one or more second level icons. The one or more second level icons may be associated with the one or more first level icons selected by the first viewer. The one or more second level icons may appear similarly to those shown in FIG. 3 and may further be displayed by first augmented reality device 115 and second augmented reality device 115 in addition to the first level icons. Alternatively, the first level icons may cease to be displayed in response to the first selection information and the second level icons may be displayed instead. As described herein previously, one or more status identifiers may be associated with the one or more second level icons.

It is to be understood that process 600 need not necessarily be performed in the exact order described herein and the steps described herein may be rearranged in some embodiments. Further, in some embodiments fewer than all steps of process 600 may be performed and in some embodiments additional steps may be performed.

According to process 600, at least two viewers using separate augmented reality devices 115 may view a single 3D visualization. The first viewer and/or second viewer may further make selections of icons within the 3D visualization, the result of such selections being displayed on each of the separate augmented reality devices 115. Process 600 as described herein may therefore allow multiple viewers, each of whom may be technicians tasked with diagnosing a technology environment, to work cooperatively to identify and remediate errors and/or failures.

Figure 7:
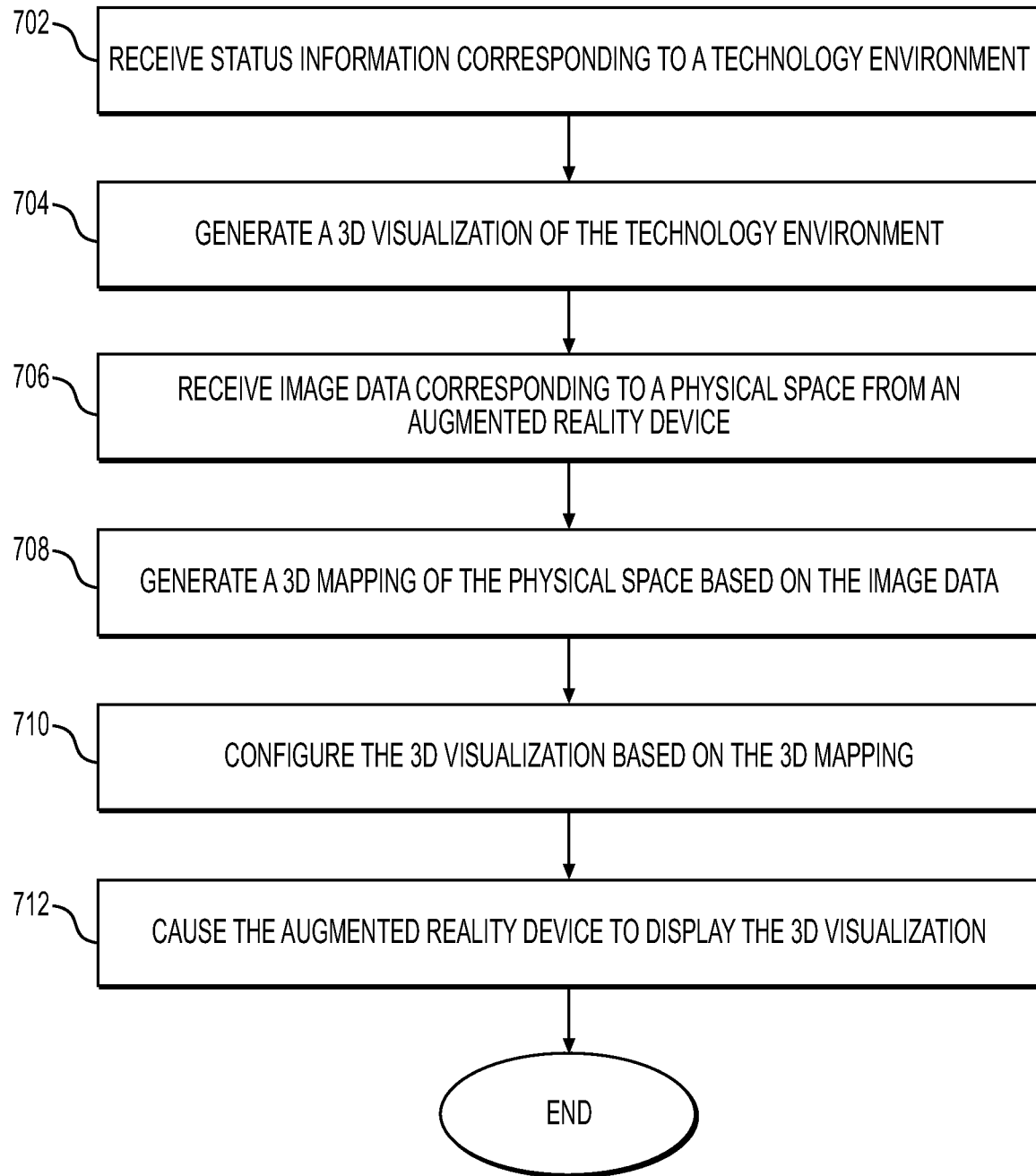
FIG. 7 depicts a flowchart of an exemplary method of displaying an augmented reality visualization based on a physical space, according to one or more embodiments.

FIG. 7 illustrates an exemplary process 700 for configuring a 3D visualization based on a physical space, according to one or more embodiments. It is to be understood that the process 700 may include fewer than all steps shown in FIG. 7 or may alternatively include additional steps not shown in FIG. 7.

At step 702, augmented reality module 118 of server system 110 may receive status information corresponding to a technology environment. Step 702 may be substantially the same as step 502 described herein previously. At step 704, augmented reality module 118 may generate a 3D visualization of the technology environment based on the status information. Step 704 may likewise be substantially the same as step 504 described herein previously.

At step 706, augmented reality module 118 may receive image data from augmented reality device 115 corresponding to a physical space in which augmented reality device 115 is located. For example, if augmented reality device 115 is being used in an office setting, the image data may correspond to the office setting. If augmented reality device 115 is being used in an outdoor setting, the image data may correspond to the particular outdoor setting. The image data may be collected by one or more image sensors and/or depth sensors included with augmented reality device 115.

At step 708, based on the image data, augmented reality module 118 may generate a 3D mapping of the physical space in which augmented reality device 115 is located. The 3D mapping may include identification and/or positioning of objects or obstructions in the physical space. The objects or obstructions may be identified from the image data using any known object recognition technique. At step 710, augmented reality module 118 may configure the 3D visualization based on the 3D mapping. For example, augmented reality module 118 may arrange icons of the 3D visualization to be displayed in unobstructed volumes of the physical space, e.g., positions not occupied by objects or obstructions existing in the physical space. Augmented reality module 118 may further arrange icons of the 3D visualization so as not to be displayed in obstructed volumes of the physical space, e.g., positions occupied by objects or obstructions existing in the physical space.

At step 712, augmented reality module 118 may cause augmented reality device 115 to display the 3D visualization according to the configuration of step 710. The 3D visualization may be displayed in a substantially similar manner as described herein previously with reference to step 506, however, icons within the 3D visualization may further be arranged in unobstructed volumes and not obstructed volumes of the physical space.

It is to be understood that process 700 need not necessarily be performed in the exact order described herein and the steps described herein may be rearranged in some embodiments. Further, in some embodiments fewer than all steps of process 700 may be performed and in some embodiments additional steps may be performed.

By receiving and processing image data corresponding to a physical space in which augmented reality device 115 is located, process 700 may allow an augmented reality visualization to be seamlessly incorporated into a viewer's space. Icons of the augmented reality visualization may therefore be positioned so that they are not hidden behind or positioned so as to overlap with physical objects or obstructions. Process 700 may therefore improve the viewer's ability to move relative to the 3D visualization to inspect certain icons without coming into contact with, or being blocked by, objects or obstructions.

Further aspects of the disclosure are discussed below. It should be understood that embodiments in this disclosure are exemplary only, and that other embodiments may include various combinations of features from other embodiments, as well as additional or fewer features.

In general, any process discussed in this disclosure that is understood to be computer-implementable, such as the processes illustrated in FIGS. 5, 6, and 7, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 8:
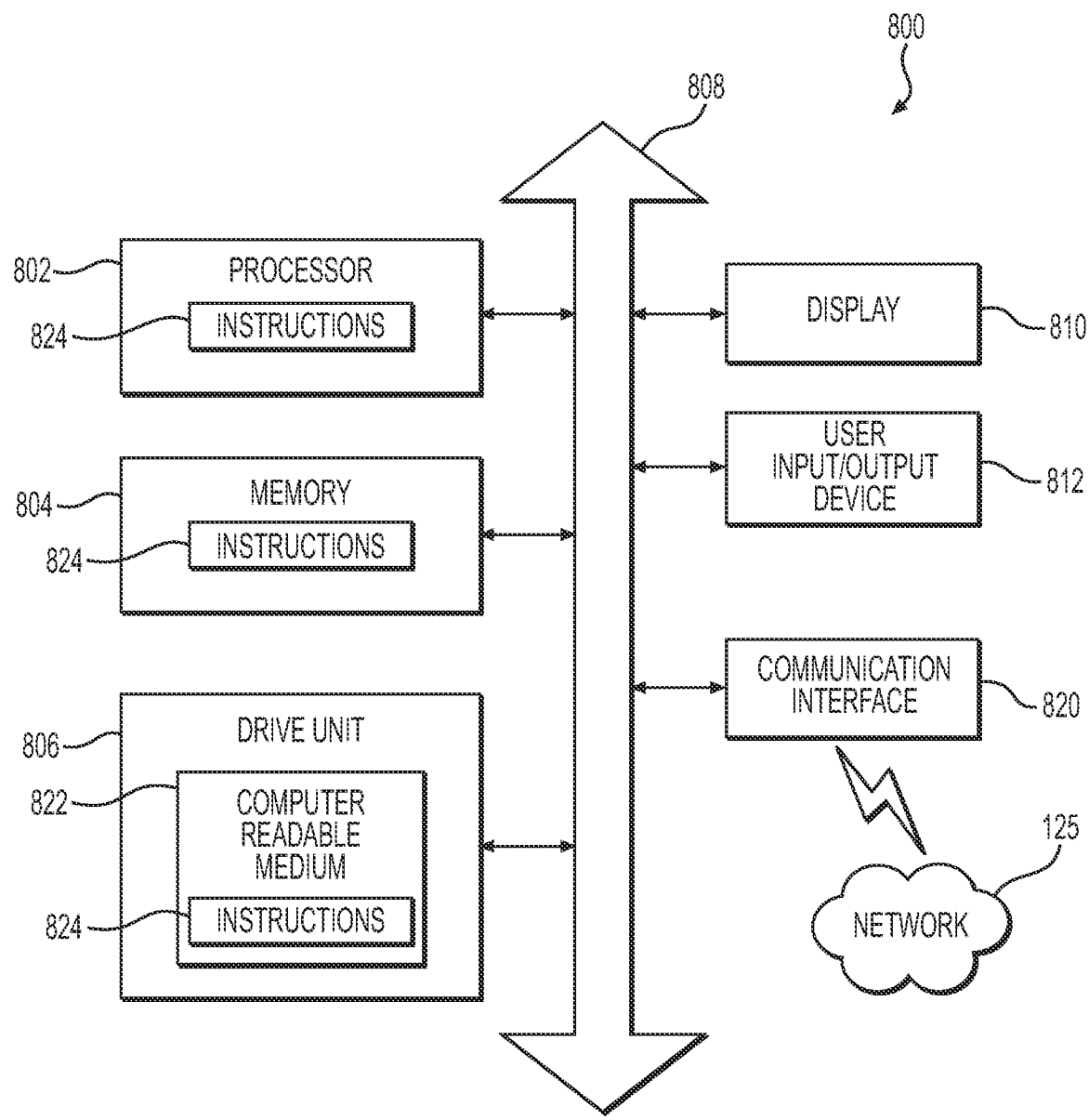
FIG. 8 depicts an example of a computing device, according to one or more embodiments.

FIG. 8 is a simplified functional block diagram of a computer system 800 that may be configured as a device for executing the processes of FIGS. 5, 6, and 7, according to exemplary embodiments of the present disclosure. FIG. 8 is a simplified functional block diagram of a computer that may be configured to serve as the user device 105, the server system 110, and/or the augmented reality device 115, according to exemplary embodiments of the present disclosure. In some embodiments, user device 105, server system 110, database 112, application module 114, system monitoring module 116, augmented reality module 118, and/or augmented reality device 115 may include the components of FIG. 8 in addition to the specific components described herein previously. In various embodiments, any of the systems herein may be an assembly of hardware including, for example, a data communication interface 820 for packet data communication. The platform also may include a central processing unit ("CPU") 802, in the form of one or more processors, for executing program instructions. The platform may include an internal communication bus 808, and a storage unit 806 (such as ROM, HDD, SDD, etc.) that may store data on a computer readable medium 822, although the system 800 may receive programming and data via network communications including via network 125. The system 800 may also have a memory 804 (such as RAM) storing instructions 824 for executing techniques presented herein, although the instructions 824 may be stored temporarily or permanently within other modules of system 800 (e.g., processor 802 and/or computer readable medium 822). The system 800 also may include input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to diagnosing a technology environment, it should be appreciated that the presently disclosed embodiments may be applicable to navigating and/or monitoring a technology environment for any other purpose.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 5, 6, and 7, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method comprising:
generating a 3D visualization of a technology environment including a plurality of components;
causing an augmented reality device to display the 3D visualization, the 3D visualization including one or more first level icons;
receiving first selection information from the augmented reality device, the first selection information being indicative of at least one first level icon, wherein the first level icon is representative of a first set of components of the technology environment; and
in response to the first selection information, causing the augmented reality device to display one or more second level icons as part of the 3D visualization, wherein each of the one or more second level icons is representative of a subset of the first set of components.

2. The computer-implemented method of claim 1, wherein the one or more first level icons includes the at least one first level icon and a plurality of other icons;
    wherein the at least one first level icon is indicative of an error occurring in one or more of the first set of components; and
    wherein the plurality of other icons are indicative of normal operation of a second set of components associated with the plurality of other icons.

3. The computer-implemented method of claim 1, further comprising:
    receiving an instruction from the augmented reality device, the instruction corresponding to at least one second level icon; and
    in response to the instruction, causing an operational change in the technology environment with respect to at least one component associated with the at least one second level icon.

4. The computer-implemented method of claim 3, wherein the operational change includes one of (1) restarting the at least one component, (2) disabling the at least one component, or (3) substituting a second component for the at least one component.

5. The computer-implemented method of claim 3, wherein prior to the operational change the at least one first level icon is indicative of an error occurring in one or more of the first set of components; and
    wherein after the operational change the at least one first level icon is indicative of normal operation of the first set of components.

6. The computer-implemented method of claim 1, further comprising:
    receiving image data from the augmented reality device, the image data corresponding to a physical space;
    generating a 3D mapping of the physical space based on the image data; and
    overlaying the 3D visualization onto the physical space based on the 3D mapping.

7. The computer-implemented method of claim 6, wherein the 3D mapping identifies obstructed volumes and unobstructed volumes of the physical space; and
    wherein the 3D visualization is displayed in one or more unobstructed volumes and not in the obstructed volumes.

8. The computer-implemented method of claim 1, wherein the augmented reality device is a wearable headset.

9. The computer-implemented method of claim 1, further comprising:
    receiving second selection information from the augmented reality device, the second selection information being indicative of at least one second level icon, wherein the second level icon is representative of a first subset of the first set of components; and
    in response to the second selection information, causing the augmented reality device to display one or more third level icons as part of the 3D visualization and to cease displaying at least the one or more second level icons.

10. A non-transitory computer-readable medium storing instructions that, when executed by one or more processors, cause the one or more processors to perform operations comprising:
    generating a 3D visualization of a technology environment including a plurality of components;
    causing an augmented reality device to display the 3D visualization, the 3D visualization including one or more first level icons;
    receiving first selection information from the augmented reality device, the first selection information being indicative of at least one first level icon, wherein the first level icon is representative of a first set of components of the technology environment; and
    in response to the first selection information, causing the augmented reality device to display one or more second level icons as part of the 3D visualization, wherein each of the one or more second level icons is representative of a subset of the first set of components.

11. The non-transitory computer-readable medium of claim 10, wherein the one or more first level icons includes the at least one first level icon and a plurality of other icons;
    wherein the at least one first level icon is indicative of an error occurring in one or more of the first set of components; and
    wherein the plurality of other icons are indicative of normal operation of a second set of components associated with the plurality of other icons.

12. The non-transitory computer-readable medium of claim 10, the operations further comprising:
    receiving an instruction from the augmented reality device, the instruction corresponding to at least one second level icon; and
    in response to the instruction, causing an operational change in the technology environment with respect to at least one component associated with the at least one second level icon.

13. The non-transitory computer-readable medium of claim 12, wherein the operational change includes one of (1) restarting the at least one component, (2) disabling the at least one component, or (3) substituting a second component for the at least one component.

14. The non-transitory computer-readable medium of claim 12, wherein prior to the operational change the at least one first level icon is indicative of an error occurring in one or more of the first set of components; and
    wherein after the operational change the at least one first level icon is indicative of normal operation of the first set of components.

15. The non-transitory computer-readable medium of claim 10, the operations further comprising:
    receiving image data from the augmented reality device, the image data corresponding to a physical space;
    generating a 3D mapping of the physical space based on the image data; and
    overlaying the 3D visualization onto the physical space based on the 3D mapping.

16. The non-transitory computer-readable medium of claim 15, wherein the 3D mapping identifies obstructed volumes and unobstructed volumes of the physical space; and
    wherein the 3D visualization is displayed in one or more unobstructed volumes and not in the obstructed volumes.

17. The non-transitory computer-readable medium of claim 10, the operations further comprising:
    receiving second selection information from the augmented reality device, the second selection information being indicative of at least one second level icon, wherein the second level icon is representative of a first subset of the first set of components; and
    in response to the second selection information, causing the augmented reality device to display one or more third level icons as part of the 3D visualization and to cease displaying at least the one or more second level icons.

18. A system comprising:
a first augmented reality device and a second augmented reality device;
one or more memories storing instructions; and
one or more processors operatively connected to the one or more memories, the one or more processors configured to execute the instructions to:
 generate a 3D visualization of a technology environment including a plurality of components;
 cause the first augmented reality device to display the 3D visualization, the 3D visualization including one or more first level icons, wherein each of the first level icons is representative of a set of components of the technology environment;
 receive, from the second augmented reality device, a session request;
 cause, in response to the session request, the second augmented reality device to simultaneously display the 3D visualization, wherein the first augmented reality device and the second augmented reality device each superimpose the one or more first level icons on a single physical environment viewable by each of the first augmented reality device and the second augmented reality device; and
 receive first selection information from the first augmented reality device, the first selection information being indicative of at least one first level icon, wherein the first level icon is representative of a first set of components of the technology environment; and
 in response to the first selection information, cause the first augmented reality device and the second augmented reality device to simultaneously display one or more second level icons as part of the 3D visualization, wherein each of the one or more second level icons is representative of a subset of the first set of components.

19. The system of claim 18, wherein the one or more processors are further configured to execute the instructions to:
 receive instruction information from the second augmented reality device, the instruction information being indicative of at least one second level icon; and in response to the instruction information, causing an operational change in the technology environment with respect to a component associated with the at least one second level icon.

20. The system of claim 19, wherein the operational change includes one of (1) restarting the at least one component, (2) disabling the at least one component, or (3) substituting a second component for the at least one component.

* * * * *